June 14, 1932. C. L. KNUTSON 1,863,060
MIRROR SUPPORTING DEVICE
Filed Oct. 22, 1928
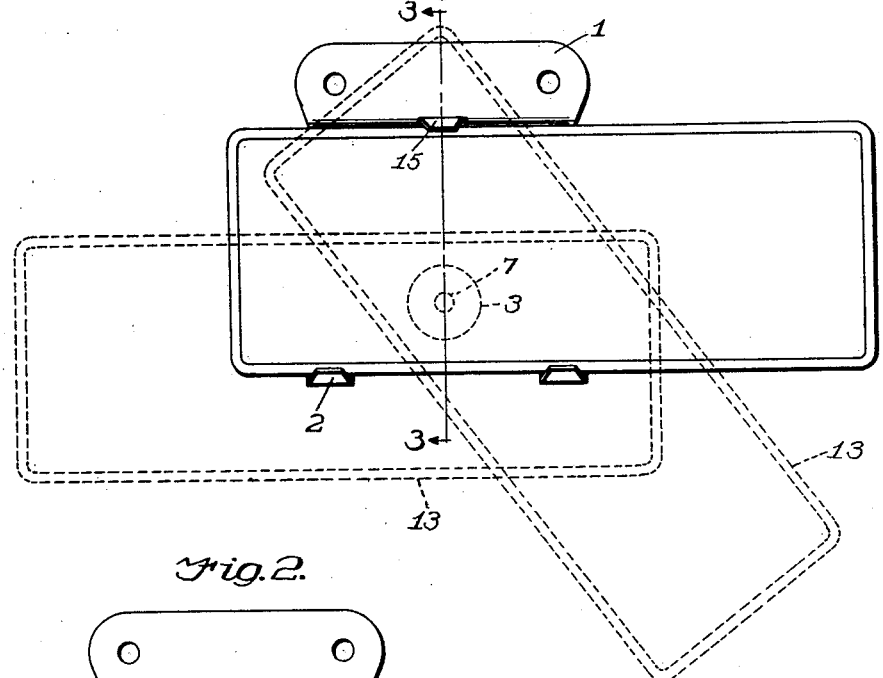
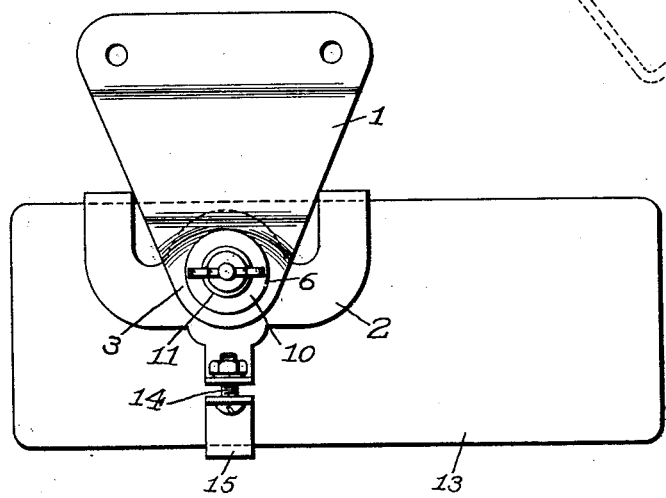 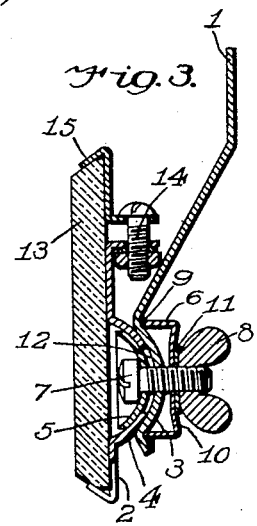
Inventor:
Carl L Knutson Patented June 14, 1932

1,863,060

UNITED STATES PATENT OFFICE

CARL L. KNUTSON, OF MAYWOOD, ILLINOIS, ASSIGNOR TO CINCH MANUFACTURING CORPORATION, OF CHICAGO, ILLINOIS, A CORPORATION OF ILLINOIS

MIRROR SUPPORTING DEVICE

Application filed October 22, 1928. Serial No. 313,995.

My invention is for improvements in adjustable mirror-supporting devices particularly adapted for rear-vision mirror devices for motor vehicles.

In the drawing accompanying and forming part of this application,—

Figure 1 is an elevation view of a complete device, the mirror being shown in dotted line positions to indicate the idea of elevational adjustment of the mirror-holding part of the device;

Fig. 2 is a rear view of the device, showing the mirror in its lowermost position; and Fig. 3 is a section of the device taken on the line 3—3 of Figure 1.

While I have illustrated in the drawing and will hereinafter describe one embodiment of my invention, I do not wish to be limited to the specific details shown and described, as my invention is best set forth in the claims forming a part of this application.

The mirror-holding device illustrated comprises a bracket part 1, a mirror-holding unit 2 and a universal joint connection between the two parts whereby the mirror-holding part may be readily adjusted angularly with relation to the bracket part 1.

The universal joint connection comprises a socket element 3 pressed from the material at the lower end of the triangular shaped bracket 1 and the hollow ball-like element 4, in the form of a hemisphere, is pressed out of the material of the mirror-holding unit 2, as best illustrated in Fig. 3. The socket and ball-like elements are held in frictional engagement by means of a dished washer 5 fitting the inside surface of the ball-like element, a yieldable cup-shaped washer 6 bearing against the socket element and a bolt in the form of a screw 7, passing through the washer 5, the elements 3 and 4 and the washer 6 and a wing nut 8 clamping the parts together.

I have found that the universal joint assembly above described is particularly adapted for rear-vision mirror devices for vehicles because the vibration of a vehicle cannot loosen the connection. Furthermore there may be a wide range of angular adjustment of the mirror-holding part relative to the bracket without changing the bolt adjustment.

The clamping elements of the universal joint connection are so arranged that the tension is distributed over the entire surface engagement between the socket element 3 and ball-like element 4. For this reason, I use a washer 5 to back-support that portion of the ball-like member 4 which engages the socket part 3, and the cup-shaped washer 6 has its rim 9 bearing against the outer peripheral edge portion of the socket part 3, all as shown in Fig. 3. The bottom 10 of the cup-shaped washer 6 is adapted to yield so that, when the wing nut 8 is tightened, the bottom 10 is flexed and held in a flexed position, thereby to exert a spring tension on the socket and ball-like elements. If desirable, a washer 11 (Figs. 2 and 3) may be used between the wing nut and the bottom 10 of the cup-shaped washer 6 to distribute the pressure applied to the bottom of the cup-shaped washer.

All of the parts through which the screw 7 passes, except the ball-like part 4, have apertures which are approximately the size of the shank of the screw so that they will remain stationary with the socket part 3. The ball-like part 4 is provided with a somewhat enlarged aperture 12 (Fig. 3), thereby to permit angular adjustment.

When my device is used as a rear-vision mirror device for motor vehicles, it is usually secured to the inside of the vehicle above the windshield so that the device may obtain a vision of the road at the rear of the vehicle. In ordinary instances, the mirror 13 may be readily adjusted to the sight of the operator of the vehicle by an angular adjustment. However, if an operator is a relatively short person, it may be necessary to change the elevation of the mirror 13 before he or she can obtain a proper view by angular adjustment. My device very readily overcomes this difficulty because the ball-like part 4 is offset with relation to the horizontal center of the mirror-holding part 2, as shown in Figs. 2 and 3. Therefore it is possible to lower the mirror 13 from the full line position, shown in Fig. 1, to the horizontal dotted line position, shown in Fig. 1, by simply turning the mirror-holding part 4 a half turn in the ball and socket joint. Then any desired angular adjustment may be had by moving the mirror-holding part about the universal connection.

If the mirror used is a relatively long one, as shown in the drawing, it may be turned without interference from the inside of the top of the vehicle body because it can be turned without passing above the edge of the bracket 1. After the mirror has been turned, it may be adjusted horizontally, if desired, by loosening the nut and screw device 14 of the clamping means 15, which holds the mirror in position with relation to the mirror-holding part 4.

My device is simple in design and assembly. It is rigidly constructed and therefore practically vibrationless, and it can be adjusted in all angular directions without changing the tension or adjustment of the universal joint.

I claim:

1. A mirror-supporting device comprising, in combination, a bracket, mirror-holding means carried by said bracket, and a universal joint connection between the bracket and the mirror-holding means permitting angular adjustment of the mirror-holding means in any direction, said universal joint connection comprising a socket portion, a rounded projection engaged directly with said socket portion, a cup-shaped member and clamping means, said cup-shaped member having a yieldable bottom which cooperates with the clamping means to press the socket portion and rounded projection together while permitting relative movement without changing the said clamping means.

2. In a mirror-supporting device having a mirror-supporting part adjustable angularly relative to a bracket, a universal joint comprising a socket element, a ball-like element cooperating therewith, a bolt securing the said elements together and a cup-shaped element having a yieldable bottom cooperating with the bolt to clamp the ball-like and socket elements together.

3. In a mirror-supporting device having a mirror-supporting part adjustable angularly relative to a bracket, a universal joint comprising a socket element, a ball-like element cooperating therewith, a bolt securing the said elements together and a cup-shaped part having its open end engaged against one of said elements and having a yieldable bottom spaced from the element against which the cup-shaped member is engaged and adapted to be flexed by said bolt to press the socket element and ball-like element while permitting adjustment of the mirror-supporting part without loosening the bolt.

4. In a mirror-supporting device having a mirror-supporting part adjustable angularly relative to a bracket, a universal joint comprising a socket element pressed from the material of the bracket, a hollow ball-like element pressed from the material of the mirror-supporting part, and clamping means holding said ball-like element in frictional contact with said socket element, said clamping means comprising a bolt, and a flexible sheet metal cup-shaped washer held in position by said bolt and having only its edge in contact with one of said elements, the base of said washer being spaced from said element whereby the clamping means may press the parts of the universal joint together.

5. In a mirror-supporting device having a mirror-supporting part adjustable angularly relative to a bracket, a universal joint comprising a socket element pressed from the material of the bracket, a hollow ball-like element pressed from the material of the mirror-supporting part, and clamping means holding said ball-like element in frictional contact with said socket element, said clamping means comprising a bolt passing through the socket and ball-like elements and holding a dished washer against the inside surface of the ball-like element, a cup-shaped washer having an open end bearing against the socket element and a flexible bottom spaced from the socket element and an adjustable nut of the bolt adjusted upon the bolt to compress the bottom of the cup-shaped washer thereby to clamp the socket and ball-like elements between the dished washer and cup-shaped washer.

In testimony whereof, I have signed my name to this specification.

CARL L. KNUTSON.